United States Patent
Mannava et al.

(10) Patent No.: US 10,579,526 B2
(45) Date of Patent: Mar. 3, 2020

(54) RESPONDING TO SNOOP REQUESTS (71) Applicant: ARM Limited, Cambridge (GB)

(72) Inventors: Phanindra Kumar Mannava, Austin, TX (US); Bruce James Mathewson, Papworth Everard (GB); Jamshed Jalal, Austin, TX (US); Klas Magnus Bruce, Leander, TX (US)

(73) Assignee: ARM Limited, Cambridge (GB)

( * ) Notice: Subject to any disclaimer, the term of this patent is extended or adjusted under 35 U.S.C. 154(b) by 81 days.

(21) Appl. No.: 15/427,410

(22) Filed: Feb. 8, 2017

(65) Prior Publication Data
US 2018/0225210 A1 Aug. 9, 2018

(51) Int. Cl.
G06F 12/08 (2016.01)
G06F 12/0831 (2016.01)
G06F 13/16 (2006.01)

(52) U.S. Cl.
CPC ...... G06F 12/0831 (2013.01); G06F 13/1615 (2013.01); *G06F 2212/60* (2013.01); *G06F 2212/621* (2013.01)

(58) Field of Classification Search
CPC .............. G06F 12/0817; G06F 12/0804; G06F 12/0833; G06F 12/0815; G06F 12/0808; G06F 12/0811; G06F 12/0828; G06F 12/0846; G06F 2212/621; G06F 2212/1016; G06F 12/0831; G06F 12/0822; G06F 13/1615; G06F 16/167; G06F 2212/60
See application file for complete search history.

(56) References Cited

U.S. PATENT DOCUMENTS

| 6,490,661 | B1 | 12/2002 | Keller et al. | |
|---|---|---|---|---|
| 2002/0078305 | A1 | 6/2002 | Khare et al. | |
| 2008/0065832 | A1* | 3/2008 | Srivastava | G06F 12/0862 711/130 |
| 2010/0199109 | A1* | 8/2010 | Terek | G06F 3/0608 713/194 |
| 2010/0235586 | A1* | 9/2010 | Gonion | G06F 12/0831 711/144 |
| 2012/0221801 | A1* | 8/2012 | Okawa | G06F 1/3212 711/154 |
| 2014/0089602 | A1* | 3/2014 | Biswas | G06F 12/0804 711/144 |
| 2014/0095808 | A1* | 4/2014 | Moll | G06F 12/0831 711/146 |

OTHER PUBLICATIONS

Combined Search and Examination Report dated Jul. 19, 2018 in GB Application No. 1800880.5, 10 pages.

* cited by examiner

*Primary Examiner* — Hiep T Nguyen
(74) *Attorney, Agent, or Firm* — Nixon & Vanderhye P.C.

(57) ABSTRACT

A data processing apparatus includes receiving circuitry to receive a snoop request sent by a source node in respect of requested data and transmitting circuitry. Cache circuitry caches at least one data value. The snoop request includes an indication as to whether the requested data is to be returned to the source node and when the at least one data value includes the requested data, the transmitting circuitry transmits a response to the source node including said requested data, in dependence on said indication.

18 Claims, 6 Drawing Sheets

RESPONDING TO SNOOP REQUESTS

TECHNICAL FIELD

The present disclosure relates to data processing. More particularly, it relates to caches.

DESCRIPTION

In a multiprocessor system, there may be a number of nodes or processors, each with their own cache(s). These nodes may be connected to one or more shared caches or memories. A particular data value can therefore be located in one of the shared caches or memories or in a local cache of one of the processors. When a node wishes to access a data value, therefore, it is sometimes necessary to obtain the data from another node. This is achieved by the requester sending a request to a so-called home node, which maintains coherency of the data throughout the system. The home node then causes nodes to "resynchronise" so that data is being held coherently in the system, before accessing the data from, for example, the main system memory. This process may have to be repeated in the future if a different node asks for the same data value. However, accessing main system memory can be time consuming.

SUMMARY

Viewed from a first example configuration, there is provided a data processing apparatus comprising: receiving circuitry to receive a snoop request sent by a source node in respect of requested data; transmitting circuitry; and cache circuitry to cache at least one data value, wherein said snoop request comprises an indication as to whether said requested data is to be returned to said source node; and when said at least one data value comprises said requested data, said transmitting circuitry transmits a response to said source node comprising said requested data, in dependence on said indication.

Viewed from a second example configuration, there is provided receiving circuitry to receive a data request in respect of requested data; and transmitting circuitry to transmit at least one snoop request to at least one other node, wherein each snoop request comprises an indicator to indicate whether said requested data should be forwarded back to said data processing apparatus in response to that other node having said requested data.

Viewed from a third example configuration, there is provided a data processing method comprising: caching at least one data value; receiving a snoop request sent by a source node in respect of requested data from a requesting node; and transmitting a response to said snoop request, wherein said snoop request comprises an indication as to whether said requested data is to be returned to said source node; and when said at least one data value comprises said requested data, said transmitting circuitry transmits said requested data to said source node in dependence on said indication.

Viewed from a fourth example configuration, there is provided a data processing method comprising: receiving a data request in respect of requested data; and transmitting at least one snoop request to at least one other node, wherein each snoop request comprises an indicator to indicate whether said requested data should be forwarded back in response to that other node having said requested data.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: receiving circuitry to receive a snoop request sent by a source node in respect of requested data; transmitting circuitry; and cache circuitry to cache at least one data value, wherein said snoop request comprises an indication as to whether said requested data is to be returned to said source node; and when said at least one data value comprises said requested data, said transmitting circuitry transmits a response to said source node comprising said requested data, in dependence on said indication.

A source node can be the home node within a system, that maintains coherency throughout that system, or it can be a proxy for the home node. For example, in an interconnect system having a number of chips there may be a source node on each chip with the home node on one of the chips. Consequently, some coherency functions can take place without a node having to communicate with the home node, which could be time consuming if the nodes are on different chips. Instead, coherency can be maintained, to some extent, by using the local source nodes. In such embodiments, the source node generates a snoop request. This is received by a responding node that potentially has the data being referred to in the snoop request. The snoop request contains an indication of whether the requested data is to be returned back to the source node or not. This can be in addition to any other coherency maintaining operations that are performed in order to maintain coherency. In particular, the indication could be that the data is not to be returned to the source node (if, for example, the default is to return the data to the source node) or the indication could be that the data is to be returned to the source node (if, for example, the default is not to return the data to the source node). In either event, the response to the snoop request, which comprises the requested data, is transmitted to the source node in dependence on the indication (and any default behaviour). In this way, it is possible for the source node to acquire a copy of the data without requiring the data to be written back to a main memory and then reretrieved from memory.

In some embodiments, said requested data is stored in said cache circuitry with a cache state that indicates the requested data is shared. A shared cache state indicates that the data is accessible (and locally stored) at several nodes, but that the node does not have the permission to modify the locally stored data.

In some embodiments, when said at least one data value comprises said requested data, said transmitting circuitry transmits a further response comprising said requested data to a requesting node that made a request at said home node for said requested data. The response sent to the source node therefore need not be the only response issued by the data processing apparatus. In particular, the data could be forwarded directly to the forwarding node as well as being forwarded back to the source node (in dependence on the indication given in the snoop request). In this manner, it is possible to quickly transmit the data to the source node so that the data can be more quickly accessed in the future, and also quickly transmitted to the requested node for accessing.

In some embodiments, said indication as to whether said requested data is to be returned to said source node is encoded as a type of said snoop request. The type of snoop request itself may indicate whether the data is or is not to be returned to the source node. Alternatively, in some other embodiments, said indication as to whether said requested data is to be returned to said source node is encoded as a bit in said snoop request. The snoop request itself could therefore have a field (such as a single bit field) that indicates whether returning data to source is expected or not.

In some embodiments, said transmitting circuitry transmits said response in dependence on a further condition. In other words, when a node has data requested in a snoop request message, if the default behaviour and indication in the snoop request indicate that the requested data value is to be returned back to the source node, a further condition dictates whether or not the requested data value is returned to the source node.

There are a number of examples of what such a further condition could be. However, in some embodiments, the data processing apparatus comprises mode switching circuitry to switch said data processing apparatus from a return permitted mode to a return prohibited mode, wherein said further condition is that said data processing apparatus is in a return permitted mode. The mode switching circuitry makes it possible for a node to switch between being willing to respond to a return to source indication, thereby returning the requested data to the source node if appropriate and being unwilling to respond to a return to source indication, thereby not returning the requested data to the source node, even if appropriate.

In some embodiments, when said data processing apparatus is in a return prohibited mode and said at least one data value comprises said requested data and said indication indicates that said requested data is to be returned to said source node, said transmitting circuitry transmits an alternative response to said source node absent said requested data. Consequently, even if the response comprising the requested data cannot be sent due to the mode of the data processing apparatus being in a return prohibited mode, the data processing apparatus can transmit an alternative response (e.g. not containing the requested data). In some embodiments, the alternative response includes the current state of the data processing apparatus (e.g. that the data processing apparatus is in a return prohibited mode).

In some embodiments, when said data processing apparatus changes between said return permitted mode and said return prohibited mode, said data processing apparatus is configured to cause said transmitting circuitry to transmit a notification to said source node comprising a current mode of said data processing apparatus. Such a notification can be used by the source node in order to determine which snoop request (i.e. to which node) should have the return to source indication indicating that the node should return the requested data to the source node.

In some embodiments, said snoop request is an invalidating snoop request. A snoop request is invalidating (as opposed to non-invalidating) where the original access request made by the requesting node is such that the requested data value needs to be invalidated in other caches. For example, this might be the case where the requesting node wants the data on a unique basis. Alternatively, this might occur where the requesting node wishes to modify the data. In either of these cases, coherency would require that other nodes invalidate their versions of the data. Where an invalidating snoop request is issued, this is sent to all nodes that potentially have the requested data locally cached so that all copies of that data are invalidated. However, if the source node desires a copy of the requested data then causing each of the nodes to send the data back to the source node could use up a great deal of bandwidth. Consequently, being able to instruct a single node to return the data to the source node makes it possible to perform the invalidation and return the data while consuming a small quantity of bandwidth. In some embodiments, the snoop request is non-invalidating. In these cases, it is sufficient to send a single snoop request to one of the nodes that potentially has the requested data, with an indication that the data should be returned to the source node. Of course, a data processing apparatus can be configured to respond to both invalidating snoop requests and non-invalidating snoop requests.

In accordance with another example configuration there is provided a data processing apparatus comprising: receiving circuitry to receive a data request in respect of requested data; and transmitting circuitry to transmit at least one snoop request to at least one other node, wherein each snoop request comprises an indicator to indicate whether said requested data should be forwarded back to said data processing apparatus in response to that other node having said requested data.

In accordance with the above, by providing an indicator in a snoop request message, it is possible to indicate to the receiving node whether or not the requested data is to be provided back to the source node if the data is held at the receiving node. As explained above, the indication can be combined with a default behaviour. In other words, the default behaviour might be to return the data to the source node, and the indication could indicate to the contrary. Alternatively, the default behaviour might be to not return the data to the source node, and the indication could be that the data is to be returned to the source node.

In some embodiments, the data processing apparatus comprises participation circuitry to store a list of which of said at least one other node can forward said requested data in response to said snoop request and having said requested data, wherein when said receiving circuitry receives a notification regarding whether one of said at least one other node can forward said requested data, said list is updated; and said transmitting circuitry is configured to inhibit sending said snoop request where said indicator indicates that requested data should be forwarded back to said data processing apparatus based on a result from said participation circuitry. In this manner, the source node can keep track of nodes that are willing to forward the requested data back to the source node, and those that are not. The data processing apparatus can then inhibit sending the snoop request based on a result from the participation circuitry, where the indicator indicates that the requested data should be forwarded back to the data processing apparatus. For example, if a node has indicated that it cannot (or will not) return data to the source node, then the transmitting circuitry may inhibit sending snoop requests to that node that indicates that data is to be returned to the source node. This can save the data processing apparatus from making unnecessary requests that will inevitably be rejected.

In some embodiments, when said receiving circuitry receives a response to said snoop request without said requested data, said transmitting circuitry transmits a memory access request to a main memory to access said requested data. Consequently, rather than keep track of nodes that are not prepared to send data back to the source node, it is possible to instead respond to any refusal by obtaining the data from elsewhere such as from main memory or potentially from another node.

In some embodiments, said data processing apparatus comprises heuristic circuitry to store, for each of said at least one other node, at least one heuristic and to provide a selected node from said at least one other node on the basis of said at least one heuristic, wherein said transmitting circuitry is configured to transmit said snoop request to said selected node. There are a number of possible heuristics that can be used. However, in some embodiments, the heuristic is indicative of a latency. Consequently, when data is to be retrieved from one of several other nodes, it is possible to send a snoop request (indicating that data is to be returned to the source node) to the node that has the lowest indicated latency. As a consequence, the data will be obtained more quickly than if the request indicating that data is to be returned to the source node was made to a node with a higher latency.

In some embodiments, said data processing apparatus comprises cache circuitry to cache at least one data value, wherein when said receiving circuitry receives a response to said snoop request comprising said requested data, said requested data is stored in said cache. By storing the returned data value in a cache, a future request for that data can be returned more quickly by the source node than if a snoop request must be issued to obtain the data from another node in the system (or if the data must be obtained from a main system memory). Consequently, the latency in respect of later requests for that data can be improved. There are a number of possibilities for what said cache may be. However, in some embodiments, said cache is a system cache. A system cache may be the final cache level in a memory hierarchy before the main system memory. The system can therefore be shared between all nodes in the system, allowing quick access to the data as compared to accessing that data from a main system memory.

Particular embodiments will now be described with reference to the figures.

Figure 1:
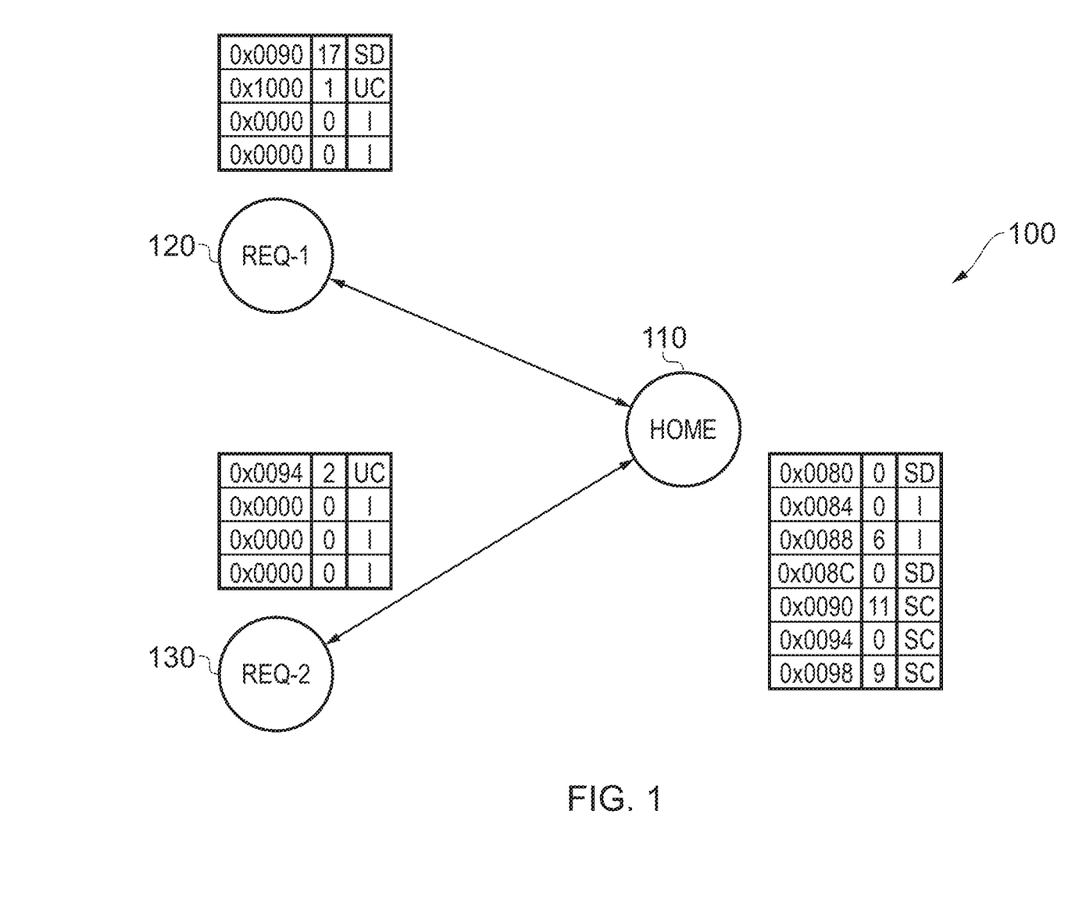
FIG. 1 illustrates a system comprising a data processing apparatus in accordance with one embodiment.

FIG. 1 illustrates a data processing system 100. Within the data processing system 100 is a home node 110 a first requesting node 120, and a second requesting node 130. The first requesting node 120 and the second requesting node 130 may be master nodes within an interconnect. In the embodiment shown in FIG. 1, the first requesting node 120 will be referred to as the requesting node whereas the second requesting node 130 will be referred to as the responding node. Each of the nodes 110, 120, 130 in the data processing system 100 comprises a cache. Each cache is shown to have three columns. The first column represents an address of a data value, the second column represents the data value itself, and the third column represents a cache state associated with that data value. In this embodiment, the cache state may be one of "I" indicating that the particular entry is invalid and can be overwritten, "SD" indicating that the particular entry is both shared and dirty (i.e. the particular entry is "owned" by that node such that the entry is shared by other nodes but has been locally modified), "SC" indicating that the entry is "shared" such that the entry is shared by other nodes in the system and is unmodifiable), and "UC" (indicating that the entry is "exclusive" such that the entry is uniquely owned by the node and has not been modified). As is illustrated in the embodiment of FIG. 1, one or more of the nodes 120, 130 could have access to a data value that the other does not have access to. For example, the requesting node 120 does not have access to the data value 0x0094, which is held by the responding node 130. Similarly, the responding node 130 does not have access to the data value 0x0090, which is held by the requesting node 120. Consequently, if the requesting node 120 wishes to access the data value 0x0094, it must send a request to the home node 110, which maintains coherency throughout the data processing system 100 in order to obtain access to that data value. This is achieved by the distribution of one or more snoop requests.

Although not shown in FIG. 1, the data processing system 100 could also comprise a main system memory, connected via the home node 110. Data can be retrieved from the main system memory on request from the home node 110. However, this process can be time consuming since accessing the main system memory will generally be slower than accessing one of the caches.

Figure 2:
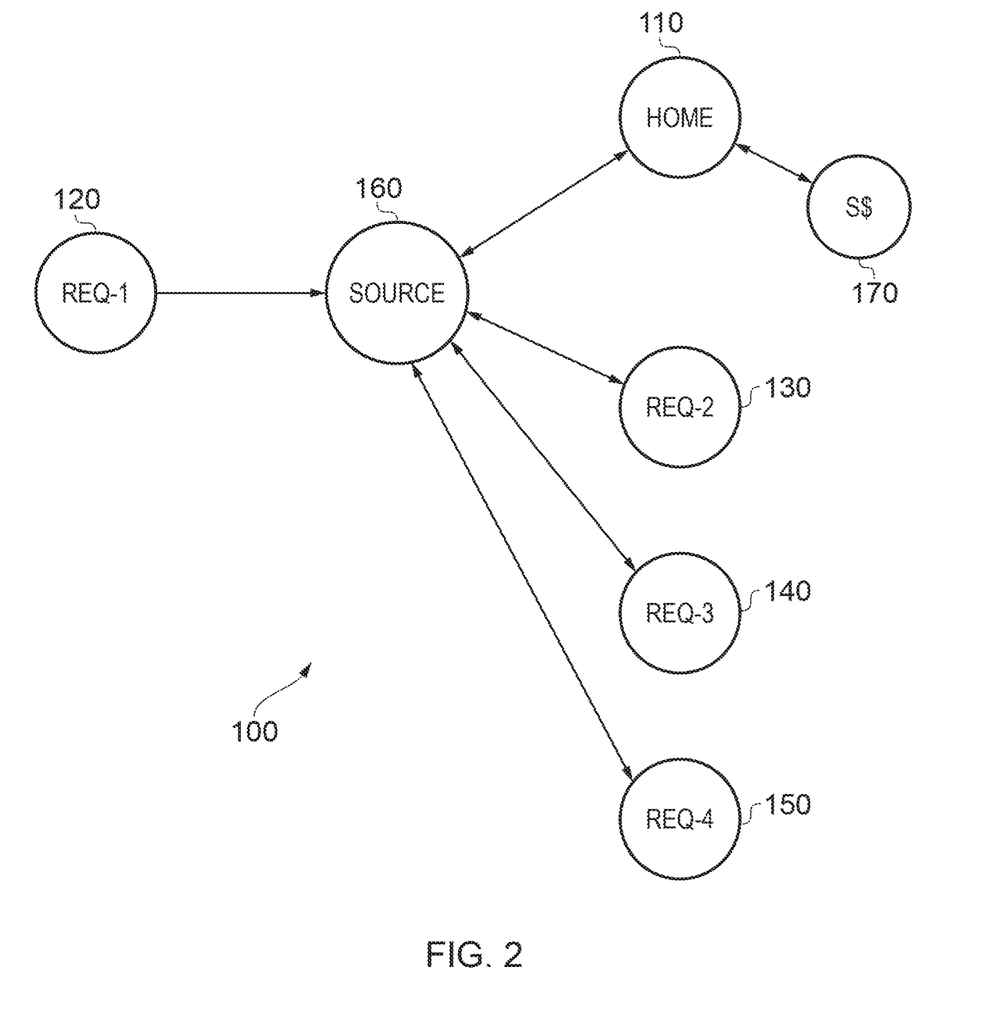
FIG. 2 illustrates a source node, home node with system cache, and four requester nodes in accordance with one embodiment.

FIG. 2 schematically illustrates the data processing system 100 in accordance with one embodiment. Four requesting nodes 120, 130, 140, and 150 are connected to a source node 160, which is in turn connected to the home node 110. A source node is a node from which a snoop request can originate. Source nodes can therefore act as proxies for the home node 110 or could be the home node 110 itself. Typically, a source node 160 could be provided on a chip where the home node 110 is on a different chip. This can reduce the amount of inter-chip communication, which can be slow and can be bandwidth limited.

The home node 110 is also connected to a system cache 170. The system cache acts as a shared cache in the system 100 and can, for example, cache data that has been retrieved from a main system memory so that the data can be accessed more quickly in the future.

Figure 3:
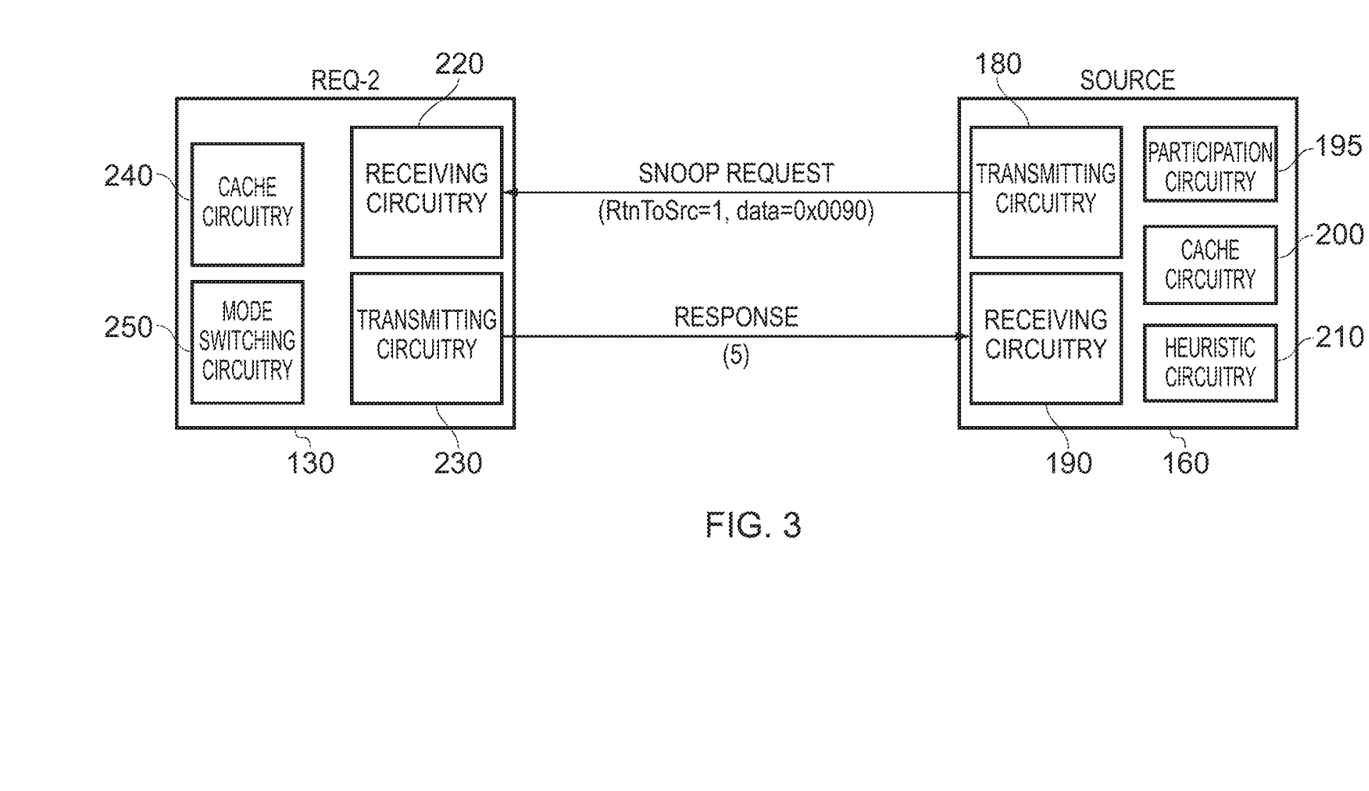
FIG. 3 schematically shows an exchange of messages between a requester node and a source node in accordance with one embodiment.

FIG. 3 schematically illustrates the structure of an example requesting node acting as a responding node 130 and source node 160 exchanging messages. In this example, it is assumed that another requesting node 120 has requested the source node 160 for access to the data at address 0x0090. This has caused the source node 160 to generate a snoop request, which is in turn send to the requesting node 130. In this example, the source node 160 comprises transmitting circuitry 180, which is circuitry for performing transmission; receiving circuitry 190, which is circuitry for receiving transmissions from other nodes; participation circuitry 195, which is circuitry for tracking the mode of other nodes (explained below); cache circuitry 200, which is circuitry for locally caching data; and heuristic circuitry 210, which is circuitry for performing heuristic analysis, e.g. based on statistical and/or historical data. The requesting/responding node 130 comprises receiving circuitry 220 for receiving transmissions from other nodes; transmitting circuitry 230, which is circuitry for performing transmission; cache circuitry 240, which is circuitry for locally caching data; and mode switching circuitry 250, which is circuitry for switching an operating mode of the requesting/responding node 130.

As previously explained, it is assumed in this example, that another requesting node 120 (not shown in this figure) has requested access to the data at address 0x0090, which is currently being held by the responding node 130. On sending this request for data to the source node 160, the source node generates a snoop request message. This snoop request message is intended to aid coherency in the system. For example, if the requesting node 120 is requesting write access to the data at address 0x0090, then the snoop request will handle the situation where another node (such as the responding node 130) has previously requested write access to the data. Two nodes cannot both have write access to the data, since this could result in different values of the data being stored at different nodes. Similarly, if other nodes (such as the responding node 130) have requested read access to the data, then this data should be invalidated, since as soon as the data is received and updated at the requesting node 160, copies of the data held at other nodes (such as the responding node 130) will be out-of-date.

In the present example, the snoop request is transmitted by the transmitting circuitry 180 of the source node 160 and received by the receiving circuitry 220 of the responding node 130. The snoop request message contains a special identifier (RtnToSrc), which indicates whether the data value held at the responding node 130 should be forwarded back to the responding node or not. In this example, the identifier takes the form of a single bit. However, in other embodiments, the identifier could form part of the type of the snoop request message. In this case, the indication, coupled with any default behaviour of the responding node (i.e. not to respond with the provided data) causes the data to be provided in a response to the snoop request. This response message contains the requested data value as held in the cache 240 of the responding node 130 (i.e. the value 5). The response message is transmitted by the transmitting circuitry 230 of the responding node 130, which is received by the receiving circuitry 190 of the source node 160.

In the embodiment shown in FIG. 3, the responding node 130 also includes mode switching circuitry 250. The mode switching circuitry makes it possible for the node to switch between a first non-returning mode, in which the node will not (even if requested) honour the RtnToSrc indication and a second returning mode, in which the node will honour the RtnToSrc indication. In other words, in either case, the node can still respond to the snoop request. However, the mode of the responding node 130 can allow or inhibit the return of the requested data to the source node 160, regardless of the request. Changes in operating mode can be notified to the source node 160, which tracks the information in its participation circuitry 195 so that the source node can keep track of those nodes that are/are not responsive to the RtnToSrc indicator. In this way, the source node 160 can avoid sending requests for the data to be returned to nodes that will not return the requested data to the source node.

Also in the embodiment shown in FIG. 3, the source node 160 includes heuristic circuitry 210. With the heuristic circuitry 210, the source node 160 keeps heuristic data. This could, for example, be statistical or historical data regarding other nodes. For example, the data could be used as part of a learning procedure by the source node in order to select an appropriate node for the purposes of issuing the RtnToSrc indication. In some instances, for example, only a single node may need to return the requested data in response to the snoop request. The source node 160 could therefore determine, using heuristic data, which node is more likely to respond the quickest, e.g. which will have the lowest latency.

Figure 4:
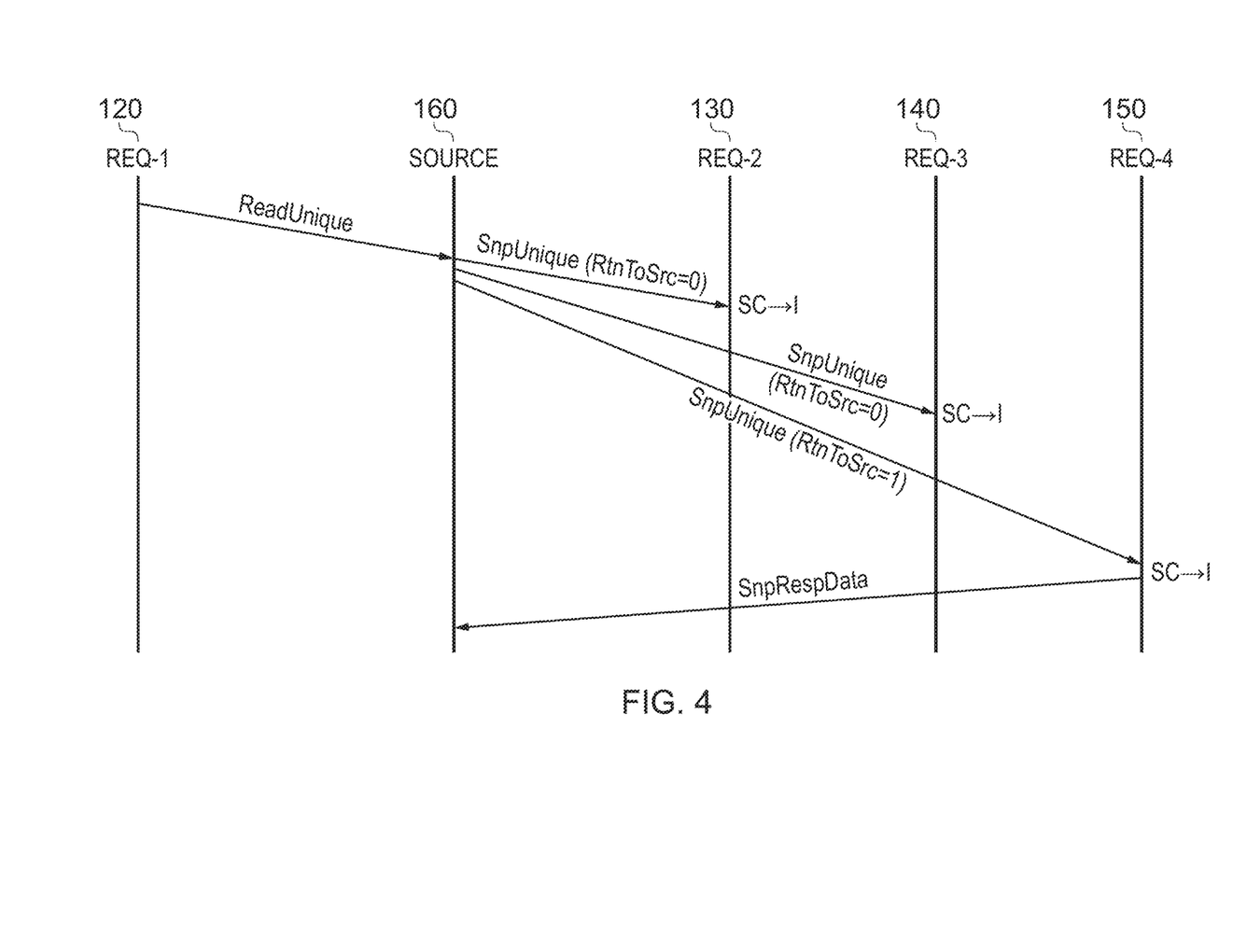
FIG. 4 shows a series of messages that are exchanged over time within a system such as that shown in FIG. 2 in accordance with one embodiment.

FIG. 4 illustrates a series of message exchanges that occur in accordance with one embodiment. Initially, the requesting node 120 issues a ReadUnique message to the source node 160, requesting unique access to a particular item of data. As a consequence of this, the source node 160 invalidates copies of the data held at other nodes in the network. It does this by sending a SnpUnique message (an example of an invalidating snoop request) to nodes that potentially have a locally cached copy of the requested data. Only one of the nodes 150 has the RtnToSrc indicator set to 1, to indicate that node is to return the requested data. Other nodes receive a message with the RtnToSrc indicator set to 0, to indicate that the node is not to return the requested data. In this way, the source node 160 is able to obtain a copy of the data, without consulting the main system memory, and without multiple copies of the data being returned. If the source node 160 has heuristic data, it might use this in order to ask the node with the least latency to return a copy of the requested data. In this way, the data can be provided back to the requesting node 120 more quickly. In this case, the requesting node 150 returns the requested data in a SnpRespData message, which is transmitted back to the source node 160. At each of the requesting nodes, the cache state is changed from SC (shared and clean) to I (invalid) to indicate that the cache line should no longer be relied upon and that the cache line can be overwritten.

Having received the data from the responding node 150, the source node 160 could return the data to the requesting node 120, and/or could cause the data to be stored back in a cache such as the system cache 170 and/or main system memory. In this way, the data can be provided to the requesting node 120 quickly (i.e. without incurring the delay of accessing the data from main memory) and can be stored in a cache 170 so that the data can be accessed more quickly if a further request is made by another node.

In this description, it has been assumed that the responding node has the data that is requested in the requesting node. If this is not the case, then clearly the responding node is unable to provide the requested data. This could be notified back to the source node 160 or no response could be given, depending on the situation. For example, if the node is in a non-returning mode such that the data is not permitted to be returned, then the node could provide no indication that it does not have the requested data.

If the node does not return the data to the source node 160 when requested (or if it takes too long to receive a response such that the source node 160 concludes that the data is not going to be returned), the source node 160 could seek the data from another requesting node or from the main system memory or a shared cache such as a system cache 170. The decision of whether or not to do this may be dependent on the expectation of success versus the time taken for each of the different options. Again, this can be determined using heuristic data if available.

Figure 5:
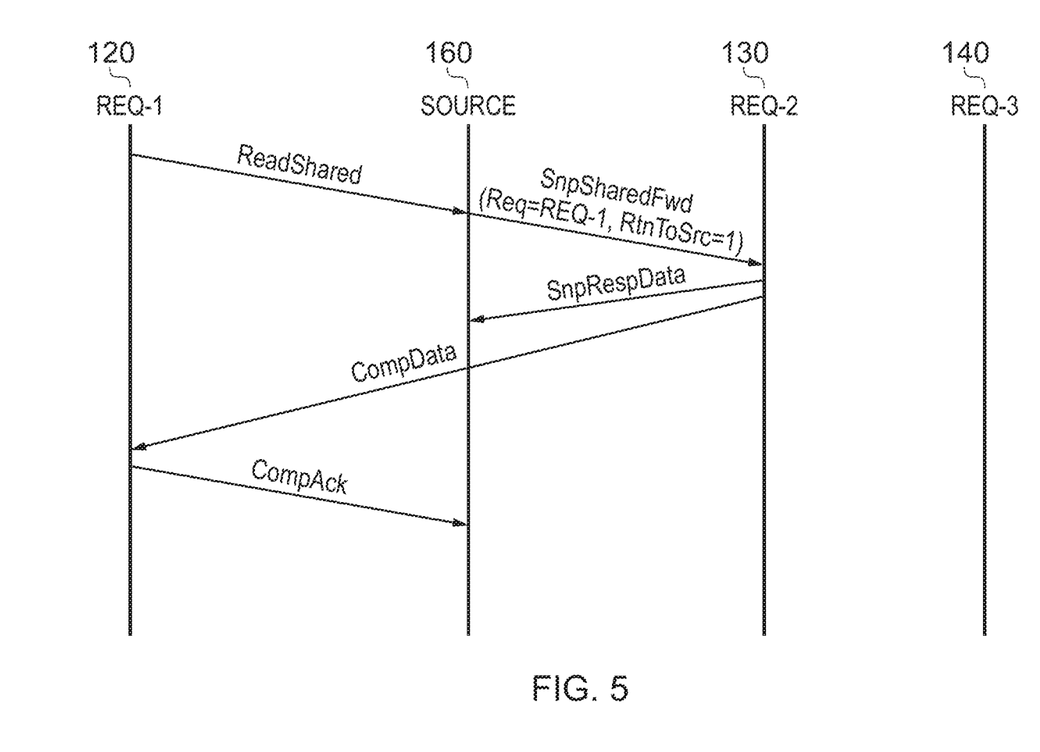
FIG. 5 shows a series of messages that are exchanged over time within a system such as that shown in FIG. 2 in accordance with one embodiment.

FIG. 5 illustrates a series of message exchanges that occur in accordance with one embodiment. In this example, the requesting node 120 only requires shared access to the data. Accordingly, when the corresponding ReadShared message is transmitted to the source node 160, the source node 160 can transmit a non-invalidating snoop, SnpSharedFwd. This is because if the requesting node 120 is not demanding to be the only node with read access to the data, there is no need to cause the data to be invalidated at other nodes. Instead, it suffices to merely obtain a copy of the data by issuing a snoop request with the RtnToSrc indicator set to indicate that the data should be returned. Again, heuristic data could be used to select which of the nodes to be queried, e.g. in order to minimise latency. On receiving the snoop request, the responding node 130 returns the requested data to the source node 160 in a SnpRespData message.

Note that in this embodiment, the responding node 130 is instructed to additionally return the requested data to the requesting node 120, which occurs in a CompData message. The requesting node 120 can then respond to the source node 160 with an indication (CompAck) that the requested data has been received, and that the source node 160 therefore need not forward the requested data a second time to the requesting node 120.

Figure 6:
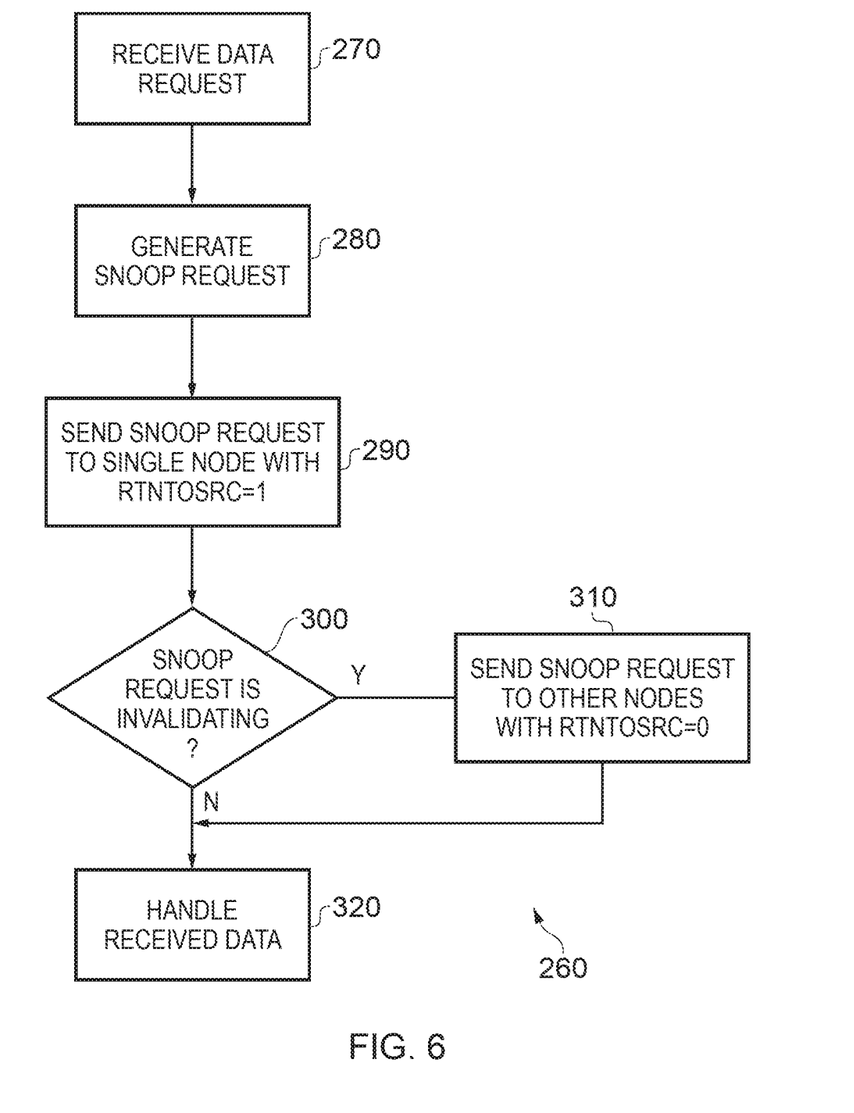
FIG. 6 shows a method of data processing in accordance with one embodiment.

FIG. 6 contains a flow chart 260, which illustrates a method of data processing in accordance with one embodiment. This method might, for example, be embodied by a source node 160. The process starts at step 270 where a request for particular data is received, e.g. by a requesting node 120. At step 280, a snoop request is generated by the source node 160. At step 290, a snoop request is sent to a single node with the indicator (RtnToSrc) set to indicate that the data value should be returned to the source node. The nature of the snoop request (invalidating or non-invalidating) is set as appropriate, based on the data request received at step 270. At step 300, it is determined whether an invalidating snoop request should be issued or not. If so, then at step 310, a similar snoop request is sent to other nodes that potentially store a copy of the requested data, in order to invalidate the data value from the caches of those nodes. In these messages, the RtnToSrc indicator is set so that the nodes will not return a copy of the requested data. This helps to prevent the source node from receiving a large number of copies of the requested data, where only one copy is necessary. Once done, or if the snoop request is non-invalidating at step 300, then at step 320, the returned data is handled. For example, the requested data can be stored in memory or in a cache such as a system cache. In addition, the requested data can be forwarded on to the requesting node, if appropriate.

In this manner, it can be seen that the requested data can be obtained without recourse to the main system memory. Furthermore, the retrieved data can be stored in a cache so that future requests can be responded to more quickly.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
receiving circuitry to receive a snoop request sent by a source node with respect to requested data;
transmitting circuitry; and
cache circuitry to cache at least one data value, wherein said snoop request comprises an indication as to whether said requested data is to be returned to said source node; and
when said at least one data value comprises said requested data, said transmitting circuitry is adapted to transmit a response to said source node comprising said requested data, in dependence on said indication, wherein
said data processing apparatus is adapted to perform a given operation on said requested data in said cache circuitry in response to receiving a snoop request; and
the indication is independent from said given operation.

2. A data processing apparatus according to claim 1, wherein
said requested data is stored in said cache circuitry with a cache state that indicates said requested data is shared.

3. A data processing apparatus according to claim 1, wherein
when said at least one data value comprises said requested data, said transmitting circuitry is adapted to transmit a further response comprising said requested data to a requesting node that made a request at a home node for said requested data.

4. A data processing apparatus according to claim 1, wherein
said indication as to whether said requested data is to be returned to said source node is encoded as a bit in said snoop request.

5. A data processing apparatus according to claim 1, wherein
said transmitting circuitry is adapted to transmit said response in dependence on a further condition.

6. A data processing apparatus according to claim 5, comprising:
mode switching circuitry to switch said data processing apparatus from a return permitted mode to a return prohibited mode, wherein
said further condition is that said data processing apparatus is in a return permitted mode.

7. A data processing apparatus according to claim 6, wherein
when said data processing apparatus is in a return prohibited mode and said at least one data value comprises said requested data and said indication indicates that said requested data is to be returned to said source node, said transmitting circuitry is adapted to transmit an alternative response to said source node absent said requested data.

8. A data processing apparatus according to claim 6, wherein
when said data processing apparatus changes between said return permitted mode and said return prohibited mode, said data processing apparatus is adapted to cause said transmitting circuitry to transmit a notification to said source node comprising a current mode of said data processing apparatus.

9. A data processing apparatus according to claim 1, wherein
said snoop request is an invalidating snoop request.

10. A data processing apparatus comprising:
receiving circuitry to receive a data request with respect to requested data; and
transmitting circuitry to transmit at least one snoop request to at least one other node, wherein
each snoop request comprises an indicator to indicate whether said requested data should be forwarded back to said data processing apparatus in response to that other node having said requested data, wherein
said at least one other node is adapted to perform a given operation on said requested data in response to receiving said snoop request; and
said indication is independent from said given operation.

11. A data processing apparatus according to claim 10, comprising
participation circuitry to store a list of which of said at least one other node can forward said requested data in response to said snoop request and having said requested data, wherein
when said receiving circuitry is adapted to receive a notification regarding whether one of said at least one other node can forward said requested data, said list is updated; and
said transmitting circuitry is adapted to inhibit sending said snoop request where said indicator indicates that requested data should be forwarded back to said data processing apparatus based on a result from said participation circuitry.

12. A data processing apparatus according to claim 10, wherein
when said receiving circuitry is adapted to receive a response to said snoop request without said requested data, said transmitting circuitry is adapted to transmit a memory access request to a main memory to access said requested data.

13. A data processing apparatus according to claim 10, comprising:
heuristic circuitry to store, for each of said at least one other node, at least one heuristic and to provide a selected node from said at least one other node on the basis of said at least one heuristic, where
said transmitting circuitry is adapted to transmit said snoop request to said selected node.

14. A data processing apparatus according to claim 13, wherein
said heuristic is indicative of a latency.

15. A data processing apparatus according to claim 10, further comprising:
cache circuitry to cache at least one data value, wherein
when said receiving circuitry is adapted to receive a response to said snoop request comprising said requested data, said requested data is stored in said cache.

16. A data processing apparatus according to claim 15, wherein
said cache is a system cache.

17. A data processing method comprising:
caching at least one data value;
receiving a snoop request sent by a source node with respect to requested data from a requesting node; and
transmitting a response to said snoop request, wherein
said snoop request comprises an indication as to whether said requested data is to be returned to said source node; and
when said at least one data value comprises said requested data, said transmitting circuitry transmits said requested data to said source node in dependence on said indication, wherein
the snoop request causes a given operation to be performed on said requested data; and
said indication is independent from said given operation.

18. A data processing method comprising:
receiving a data request with respect to requested data; and
transmitting at least one snoop request to at least one other node, wherein
each snoop request comprises an indicator to indicate whether said requested data should be forwarded back in response to that other node having said requested data, wherein
said snoop request causes said at least one other node to perform a given operation on said requested data in a cache of said at least one other node; and
said indication is independent from said given operation.

* * * * *